F. R. DRESBACK & E. M. RECKARDS.
APPARATUS FOR APPLYING SOLUTIONS TO ANIMALS.
APPLICATION FILED SEPT. 24, 1908.
974,042.
Patented Oct. 25, 1910.
2 SHEETS—SHEET 1.
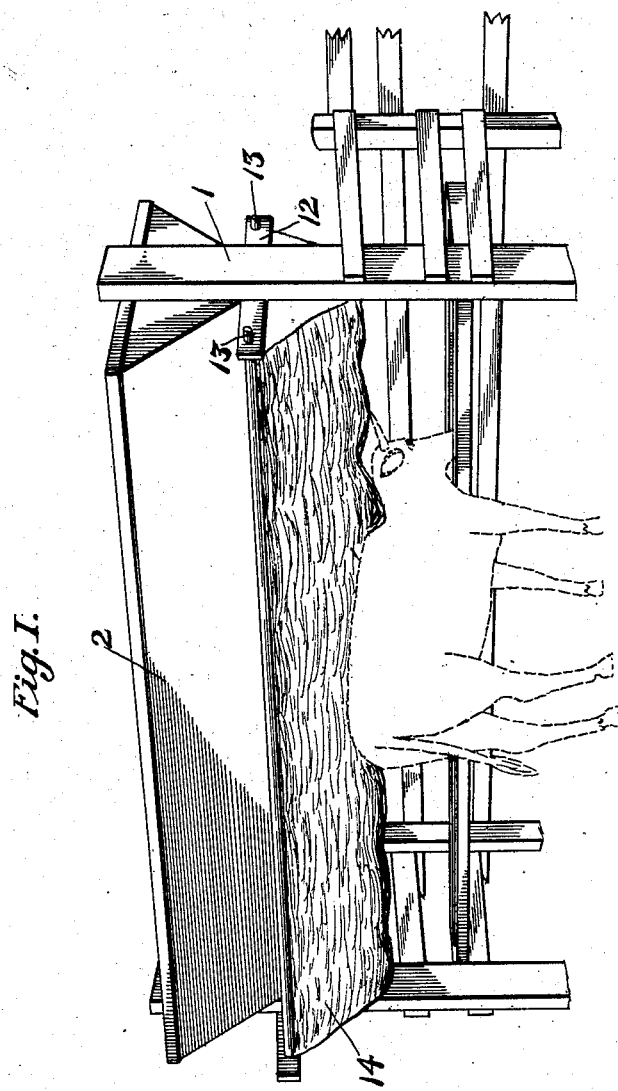
WITNESSES:
Inventors.
F. R. Dresback,
E. M. Reckards.
BY
ATTORNEY.

F. R. DRESBACK & E. M. RECKARDS.
APPARATUS FOR APPLYING SOLUTIONS TO ANIMALS.
APPLICATION FILED SEPT. 24, 1908.
974,042.
Patented Oct. 25, 1910.
2 SHEETS—SHEET 2.
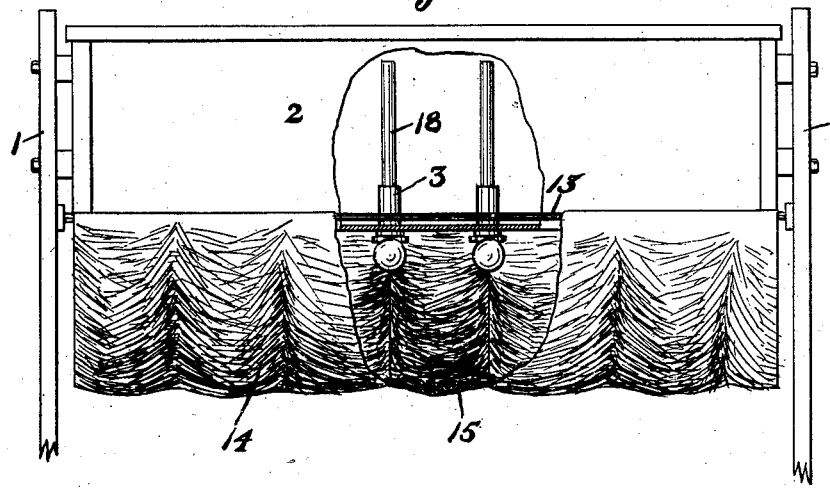
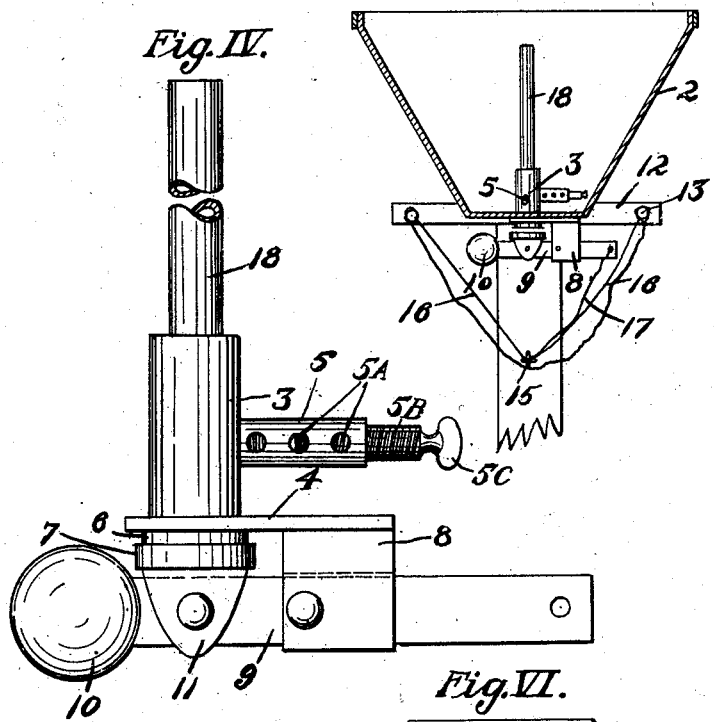
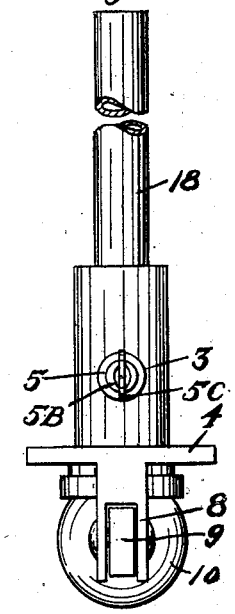
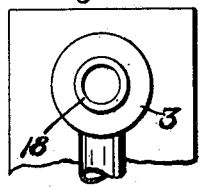
WITNESSES:
Harold C. Richards.
Myrtle M. Jackson.
Inventors:
F. R. Dresback,
E. M. Reckards
BY Arthur C. Brown.
ATTORNEY.

UNITED STATES PATENT OFFICE.

FRANK R. DRESBACK, OF KANSAS CITY, MISSOURI, AND EDWIN M. RECKARDS, OF OZAWKIE, KANSAS.

APPARATUS FOR APPLYING SOLUTIONS TO ANIMALS.

974,042.  Specification of Letters Patent.  Patented Oct. 25, 1910.

Application filed September 24, 1908. Serial No. 454,606.

*To all whom it may concern:*

Be it known that we, FRANK R. DRESBACK, a citizen of the United States, residing at Kansas City, in the county of Jackson and State of Missouri, and EDWIN M. RECKARDS, a citizen of the United States, residing at Ozawkie, in the county of Jefferson and State of Kansas, have invented certain new and useful Improvements in Apparatus for Applying Solutions to Animals; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to an apparatus for applying medicated solution to animals, and has for its object to provide an apparatus whereby the solution or "dip" may be applied to an animal otherwise than by compelling it to pass through a tank within which the liquid is contained. In accomplishing this object we provide an overhead tank within which the solution may be contained, and means for causing a quantity of the solution to discharge over an animal passing or standing therebeneath, our invention comprising an apron that is adapted for saturation with the liquid and contact with the animal's back, and a system of valves for controlling the discharge from the tank.

A further object of our invention is to provide other improved details of structure presently described and illustrated in the accompanying drawings in which:—

Figure I is a view of an apparatus constructed according to our invention, illustrating its preferred form of operation. Fig. II is a side view of same, a portion of the tank and apron being broken away to show the interior construction. Fig. III is a vertical sectional view through the tank and apron, illustrating the arrangement of one of the valves. Fig. IV is an enlarged view of one of the valves and oil chambers. Fig. V is an end view of same. Fig. VI is a top plan view of the oil chamber and air vent.

Referring more in detail to the parts:—1 designates the standards between which the tank 2 is supported; such tank being preferably of metal and attached at its ends to the upper portions of the standards, and the sides of tank being preferably inclined, as shown, to provide a contracted bottom.

3 designates cylinders which are located at intervals throughout the length of the tank and project through the tank bottom, being preferably anchored thereto by means of brackets 4 which may be riveted or otherwise rigidly secured to the tank. Each of the cylinders 3 projects upwardly into the interior of the tank for a suitable distance and is closed at the top but provided with a laterally projecting feed tube 5 that is open at its free end and provided at intervals throughout its length with intake ports $5^A$.

$5^B$ designates a threaded plug that is adapted for adjustment in the tube 5 to open or close a desired number of the ports $5^A$, and $5^C$ a thumb piece on the free end of said plug. The lower end of the cylinder 3 projects through the bottom of the tank and is provided with a flange 6 against which a valve plate 7, preferably of leather or like material, may abut to close the cylinder, as will presently be described.

Depending from bracket 4 is a yoke 8 in which is pivotally mounted a lever arm 9, the end of which, adjacent to the cylinder, is provided with a weight 10 for the purpose of retaining that end of the lever away from the tank, the valve plate 7 being carried on a yoke 11 which is pivotally mounted on the lever arm between the weight 10 and yoke 8.

12 designates cross arms which are mounted on the standards 1 below the tank 2 and have perforations near their ends through which the rods 13 project.

14 designates an apron preferably trough shaped and constructed of burlap, or other material having a coarse mesh and which may be quickly and readily saturated with liquid.

15 designates a chain or like device which extends longitudinally through the apron and is adapted to be supported on the bottom thereof, for the purpose of retaining the cylinder valves closed in the manner presently set forth, the chain being provided at regular intervals throughout its length, preferably adjacent to each of the valve seats, with the guy ropes 16 which are connected with the rod 13 and limit the lateral movement without affecting the vertical movement of the chain.

17 designates ropes which are connected with the ends of the levers 9 opposite the weights and the valve plates and are connected at their lower ends with the chain 15, the adjustment of the parts being such that under normal conditions the weight of the chain will depress all of the free ends of the valve levers and retain the plates 7 in contact with the cylinder flanges and prevent the escape of solution into the apron.

18 designates a pipe which projects into the top of cylinder 3 and is extended upwardly to such height that its free end will be above the surface of the liquid in the tank when the latter is filled to its maximum depth; such pipe serving as an air vent and facilitating the discharge of liquid from the cylinder.

When in use the apparatus may be located in the panel of a fence or set up on standards in a field, as illustrated in Fig. I. The plugs 5^B are first regulated to expose a sufficient number of the ports 5^A to admit the desired flow of oil or solution to the cylinder, and the tank filled to a desired depth with a medicated solution, or liquid, such as crude oil. When the liquid is placed in the tank it flows through the ports 5^A and tubes 5 into and filling the cylinders 3, the lower discharge ports of which are closed by the valve plates 7. Under normal conditions the weight of the chain will retain the valve plates against the cylinder ports so as to prevent the escape of the solution, but when an animal passes beneath the apparatus he raises a portion of the apron, and lifts the chain weight at that point so that the adjacent valve rod is relieved of the weight of the chain, and the corresponding valve depressed by its weight 10, so that the plate 7 is moved away from the cylinder and the charge of solution contained therein dropped into the apron. The apron being of coarse material, the solution passes readily therethrough onto the back of the animal so that the liquid may flow down its sides or, if the animal is moved beneath the apron, the liquid is wiped over its back during its travel beneath the apparatus.

By providing the cylinder with a discharge port of considerable area, the entire charge of oil or solution is dropped so that the liquid may be applied as soon as the valve is opened, but the cylinder being fed from a relatively small port, there would be no waste should the valve remain open for some time, as the solution feeds but slowly into the cylinder through the small opening.

By placing the valves at intervals throughout the length of the tank, the solution may be applied at any point at which the apron may be engaged by the animal, and a number of animals may be treated simultaneously from different cylinders.

It can readily be understood that the height of the tank and apron may be varied for the accommodation of different animals and that devices, such as salt boxes or the like, may be provided to attract the animals to the apparatus.

Having thus described our invention, what we claim as new therein and desire to secure by Letters Patent is:—

1. An apparatus of the class described, comprising a tank having outlets, valves adapted to close said outlets and provided with means for yieldingly urging the same toward open position, a flexible, trough-shaped apron located beneath said outlets, and a weight member having connection with all of said valves and adapted to hold said valves in closed position, said weight member being positioned to lift with said apron, for the purpose set forth.

2. An apparatus of the class described comprising a tank, having discharge ports in its bottom, valves adapted for closing said ports, an apron suspended beneath said tank, means located in said apron whereby said valves are normally retained in their closing position, and means for opening said valves when they are relieved from the tension of the closing means.

3. An apparatus of the class described comprising a tank having outlet ports, valves adapted to close said ports but provided with means for yieldingly tensioning the same away from said ports, an apron located beneath said ports, and a weight member connected with each of said valves and adapted for retaining the same in closed position, said weight member being adapted to be lifted upon the lifting of said apron, for the purpose set forth.

4. An apparatus of the class described comprising an apron, a tank having ports adapted for discharge into said apron, valves adapted for closing said ports, a flexible weight member extending longitudinally through the lower portion of said apron, means connecting said weight member with each of said valves whereby said valves are yieldingly retained in their closed position, and means whereby said valves are rocked from their closed position when relieved of the tension of said weight member.

5. An apparatus of the class described comprising a flexible apron, a solution tank located above and having ports adapted for discharge into said apron at various points throughout its length, valves controlling the discharge through said ports, a weight member and connection between said weight member and each of said valves whereby an adjacent valve may be operated singly when the apron is raised at any point throughout its length.

6. An apparatus of the class described comprising a flexible apron adapted for saturation by a suitable liquid, a tank located above said apron, and provided with dicharge ports, valves for said ports, means for yieldingly retaining said valves in port-opening position, a flexible weight member extending longitudinally through and supported on the bottom of said apron, flexible means connecting each of said valves with said weight member, and lateral guy members connected with said weight member, substantially as and for the purpose set forth.

7. An apparatus of the class described comprising a solution tank, a cylinder located in and extending through the lower portion of said tank, a pivoted valve lever located adjacent to said cylinder and provided at one end with a valve member adapted for closing the cylinder discharge port, a weight member connected with the opposite end of said lever and adapted for actuation by an animal passing beneath the apparatus, and means on the valve end of said lever whereby the valve is opened upon the actuation of said weight member.

8. An apparatus of the class described comprising a solution tank, cylinders located at intervals throughout the length of and projecting through the bottom of said tank, each of said cylinders being provided with relatively large discharge and small intake ports, a lever pivoted adjacent to each of said cylinders, a flat valve on each of said levers adapted for abutment against the discharge port of the adjacent cylinder, a weight on said lever adapted for positioning said valve away from said cylinder, an apron suspended beneath said tank, a flexible valve closing means supported in the bottom of said apron, and ropes connecting said levers with said means, and adapted for retaining said levers in position for closing the valves when the chain is in normal position, substantially as and for the purpose set forth.

9. The combination with suitable standards, of a tank supported by and between said standards, cross arms on said standards, rods carried by said cross arms at opposite sides of said standards, a flexible apron carried by said rods, and means whereby a quantity of liquid may be discharged from the tank over said apron when said apron is raised from beneath.

In testimony whereof we affix our signatures in presence of two witnesses.

FRANK R. DRESBACK.
EDWIN M. RECKARDS.

Witnesses for Frank R. Dresback:
MYRTLE M. JACKSON,
E. A. CAHILL.

Witnesses for Edwin M. Reckards:
J. J. KING,
J. B. CAIN.